United States Patent [19]

Walker

[11] 4,167,354
[45] Sep. 11, 1979

[54] ELONGATED MULTIPART STRUCTURAL MEMBER

[76] Inventor: Brooks Walker, 1280 Columbus Ave., San Francisco, Calif. 94133

[21] Appl. No.: 885,685

[22] Filed: Mar. 13, 1978

[51] Int. Cl.² .................... F16D 1/00; F16G 11/00
[52] U.S. Cl. .................... 403/291; 403/303; 403/109
[58] Field of Search ............ 403/104, 106, 109, 166, 403/303, 304, 291, 300, 148; 135/DIG. 9

[56] References Cited

U.S. PATENT DOCUMENTS

| | | | |
|---|---|---|---|
| 2,483,396 | 10/1949 | Benson | 403/109 X |
| 2,594,392 | 4/1952 | Care et al. | 403/109 X |
| 3,635,233 | 1/1972 | Robertson | 135/15 PQ X |
| 3,730,544 | 5/1973 | Hyman | |
| 3,834,410 | 9/1974 | Leibel | 135/15 PQ |
| 3,963,037 | 6/1976 | Clark | 403/109 X |

FOREIGN PATENT DOCUMENTS 98563 7/1961 Norway ............ 135/15 PQ

Primary Examiner—Wayne L. Shedd
Attorney, Agent, or Firm—Gordon Wood

[57] ABSTRACT

An elongated structural member adapted to many uses is made in separable, coaxially aligned sections to permit the sections to be stored in a short space. The sections are readily secured together in end to end relationship to form a strong member which may take both tension and compression.

9 Claims, 7 Drawing Figures

U.S. Patent  Sep. 11, 1979  4,167,354
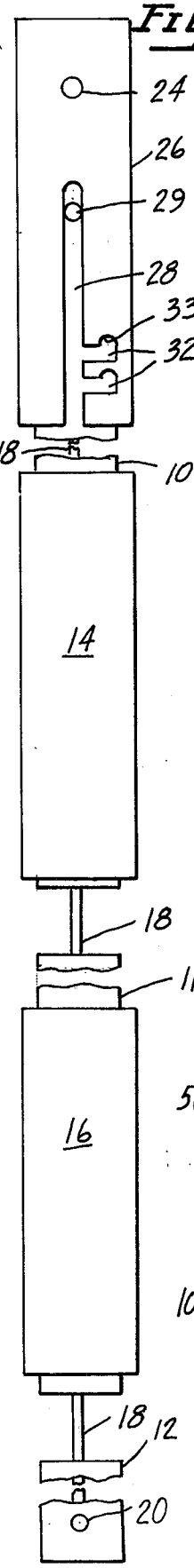

ELONGATED MULTIPART STRUCTURAL MEMBER

This invention relates to an elongated, multipart structural member which is adapted for use in many applications. For purposes of illustration the structural member shown herein is an elongated handle that is suitable for use, for example, with a suitcase carrier of the type shown in copending application Ser. No. 882,530, filed Mar. 1, 1978. It may also be used as a cane, a long cleaning rod, paint brush or roller holder, light bulb changer, etc.

Other objects and advantages will be apparent from the following specification and from the drawings.

FIG. 1 is a reduced side elevation of an elongated structual member formed in accordance with the invention and shown in its connected condition ready for use.

FIG. 2 is a side elevation of the device of FIG. 1 but with the sections separated and ready for storage.

FIG. 3 is an enlarged side elevation of the device of FIG. 2 with most of the length of the elongated sections broken away to accomodate the view.

FIG. 4 is a fragmentary side elevation of the tensioning sleeve of FIG. 3 showing the same in its tensioning position.

FIG. 5 is a side elevation similar to FIG. 3 but showing a modified form of the invention with the sections connected together.

FIG. 6 is a side elevation of the upper end of the structure of FIG. 5 showing the tensioning means in its relaxed condition to permit separation of the sections.

FIG. 7 is a reduced scale view of the sections of FIG. 5 showing said sections in stored condition.

One form of the invention is shown in FIG. 1 wherein the structural member is formed by three coaxial sections 10, 11 and 12. To prevent relative lateral movement between adjacent sections sleeves 14, 16 are provided which may be moved from the position shown in FIG. 2 in which they are free from the ends of adjacent sections to the position of FIG. 1 where they retain said sections in coaxial end to end relation.

Tension on the structural member is provided by means of an elongated tension element such as a flexible cable or wire 18 which is secured on a pin 20 diametrally secured adjacent the outer end of section 12. The other end of wire 18 is secured to a pin 24 diametrally secured to the outer end of a sleeve 26 which in turn is telescopically received over the adjacent end of section 10.

The sleeve 26 is formed with a longitudinally extending slot 28 in its periphery which is adapted to receive therein a pin 29 fixedly secured to section 10 adjacent the end thereof. Communicating with slot 28 are one or more circumferentially extending slots 32 each being enlarged at its inner end to provide a recess 33 which is adapted to receive pin 29. When it is desired to tension the member from the separated condition of FIG. 2 to the working condition of FIG. 1 tension is applied to sleeve 26 relative to section 10 so that the pin 29 may enter one of the slots 32 whereby upon rotating the sleeve 26 relative to section 10 the pin 29 may be received in one of the recesses 33 as best seen in FIG. 4. By providing more than one slot 32 adjustment of the effective working length of wire 18 is more readily accomplished. In addition, a plurality of slots 32 permit adjustment for stretching of the wire 18 and its end connections.

In order to form a stop to permit correct positioning of sleeves 14, 16 relative to the adjacent sections the exterior of sections 11, 12 may be knurled to provide bands 36 which thus act as stops.

A modified form of the invention is shown in FIGS. 5, 6 wherein sections 10', 11' and 12' are shown connected together in their tensioned condition. In this case the sections 10' and 11' are provided with coaxial extensions 40 which may be formed of tubular material and secured within said sections 10', 11' in any desired manner. The outer ends of said extensions 40 fit within the adjacent ends of sections 11', 12' as seen in FIG. 5. In order to facilitate the assembly of the member said extensions may be provided with frustoconical ends 42. Said ends are suitably apertured for receiving therethrough the tension wire 44 which is secured to the lower end of section 12' by means of crimped fitting 41 secured by pin 45 within a tubular piece 43 similar to extensions 40. Crimped fitting 41 may be externally threaded as at 46 to permit securement to a member such as the carrier of the above noted pending application.

The opposite end tension wire 44 is secured to a fitting 48 which in turn is swingably connected to an elongated handle 50 by means of pin 52. The handle 50 is formed to provide a recess 54 which is adapted to engage the periphery of a ferrule 56 threadedly secured to the outer end of section 10' (FIG. 7). It will be apparent from this structure that the handle 50 may be swung from the position shown in FIG. 6 to the position shown in FIG. 5 so as to apply tension to wire 44. By forming the handle and fitting 48 so that the pivot 52 is slightly outwardly from the ferrule 56 the arrangement of FIG. 5 is stable and there is no tendency for the handle 50 to swing counterclockwise without an effort being applied thereto. Adjustment of the tension in wire 44 may be obtained by simply rotating ferrule 56.

The above described structure of FIG. 5 is particularly adapted for use when interfitting extensions 40 are employed as opposed to the butt type connection of FIGS. 1 to 3 or when more tension of the cable is desired for greater stiffness of the structure.

When not in use the device may be collapsed to the position of FIG. 7 with the sections 10, 11, 12 in substantially side by side parallel relationship thus permitting it to be stored in a realtively short space. The same storage arrangement is, of course, possible with the structure of FIGS. 1-4.

I claim:

1. An elongated multipart structural member comprising:
   a plurality of elongated sections of substantially uniform cross section adapted to be joined together coaxially in end to end relationship to form said member,
   an elongated tension element secured at opposite ends of said member for holding said sections together,
   means for tensioning said element, and
   a sleeve adjacent the juncture of each pair of adjacent sections and movable along said member from a position uncovering such juncture to a position covering such juncture for preventing relative lateral movement of the adjacent sections.

2. A member according to claim 1 wherein a sleeve is received on one end section, said tension element being connected to said sleeve, means on said one section for holding said sleeve in a position tensioning said tension element.

3. A member according to claim 1 wherein a handle is provided at one end section and connected to said tension element, said handle being swingable from a position outside said one end section to tension said tension element, to a position substantially within said end section to permit said sections to be separated.

4. A member according to claim 3 wherein said handle is formed with a portion for pivotally engaging a sidewall of said member.

5. A member according to claim 4 wherein said sidewall includes means for axially moving the point on which said handle pivots.

6. An elongated multipart structural member comprising:
a plurality of elongated sections of substantially uniform cross section adapted to be joined together coaxially in end to end relationship to form said member,
an elongated tension element secured at opposite ends of said member for holding said sections together,
means for tensioning said element, and
elongated interengaging locking elements at the juncture of each pair of adjacent sections for preventing relative lateral movement of said adjacent sections,
said locking elements comprising an elongated extension of reduced cross section in one element and a complementarily formed opening in the adjacent element,
a sleeve received on one end section, said tension element being connected to said sleeve, means on said one end section for holding said sleeve in a position tensioning said tension element.

7. An elongated multipart structural member comprising:
a plurality of elongated sections of substantially uniform cross section adapted to be joined together coaxially in end to end relationship to form said member,
an elongated tension element secured at opposite ends of said member for holding said sections together,
means for tensioning said elements,
elongated interengaging locking elements at the juncture of each pair of adjacent sections for preventing relative lateral movement of said adjacent sections,
said locking elements comprising an elongated extension of reduced cross section in one element and a complementarily formed opening in the adjacent element,
a handle provided at one end section and connected to said tension element, said handle being swingable from a position outside said one end section to tension said tension element to a position substantially within said end section to permit said sections to be separated.

8. A member according to claim 7 wherein said handle is formed with a portion for pivotally engaging a sidewall of said member.

9. A member according to claim 8 wherein said sidewall includes means for axially moving the point on which said handle pivots.

* * * * *